United States Patent [19]

Akkermans

[11] Patent Number: 5,268,885
[45] Date of Patent: Dec. 7, 1993

[54] METHOD AND MEANS FOR DETECTING AND STABLIZING CONTROL LOOP PARAMETERS OF APPARATUS FOR SCANNING A RECORD CARRIER

[75] Inventor: Antonius H. M. Akkermans, Eindhoven, Netherlands

[73] Assignee: U.S. Philips Corporation, New York, N.Y.

[21] Appl. No.: 848,808

[22] Filed: Mar. 10, 1992

Related U.S. Application Data

[63] Continuation-in-part of Ser. No. 580,241, Sep. 7, 1990, abandoned.

[30] Foreign Application Priority Data

Oct. 25, 1989 [NL] Netherlands .................... 8902640

[51] Int. Cl.$^5$ .............................................. G11B 7/00
[52] U.S. Cl. .................................................. 369/44.29
[58] Field of Search ............... 369/44.27, 44.29, 44.31, 369/44.34, 44.35, 44.36, 54, 43

[56] References Cited

U.S. PATENT DOCUMENTS 4,942,564 7/1990 Hofer et al. ..................... 369/54

Primary Examiner—Donald E. McElheny, Jr.
Attorney, Agent, or Firm—Leroy Eason

[57] ABSTRACT

Scanning apparatus for an optical record carrier includes a position control loop, a focus control loop, and an adjustment circuit for stabilizing a control parameter of each loop such as the gain and frequency transfer characteristic thereof. To detect the value of the control parameter of a control loop a calibration signal of relatively high frequency is intermittently introduced therein. This makes possible more sensitive detection of the loop response than if a low frequency calibration signal were employed. Despite the higher frequency, the power consumption of the apparatus due to the calibration operation is relatively low because the calibration signal is only intermittent. The adjustment circuit detects the signal produced by a control loop in response to the calibration signal and by comparison therewith derives an adjustment signal for adjusting the control parameter of such loop. The adjustment signal is stored in digital form, whereby it is retained without drift even during off intervals of the calibration signal. Switching means are provided for enabling the loop adjustment circuit to be selectively connected to either control loop. Such switching means may take the form of a programmable digital control unit.

12 Claims, 3 Drawing Sheets

METHOD AND MEANS FOR DETECTING AND STABLIZING CONTROL LOOP PARAMETERS OF APPARATUS FOR SCANNING A RECORD CARRIER

Related Application

This is a continuation-in-part of application Ser. No. 07/580,241, filed Sep. 7, 1990.

1. Field of the Invention

The present invention relates to a method and means for detecting and stabilizing critical parameters of one or more control loops in apparatus for scanning a record carrier. It provides for supplying the control loop with a calibration signal of known properties, detecting the change in one or more parameters of the control loop in response to the applied calibration signal, and adjusting the control loop to stabilize such parameters.

By comparing, for example, the amplitude or phase of the detected response signal with that of the applied calibration signal or with a fixed reference voltage, it is possible to obtain a measure of the gain of the control loop. It is also possible to derive a measure of the offset error of the control loop from the energy content of the response signal.

2. Description of the Related Art

A method and means of the general type described above is known from European Patent Specification 0,021,510, published Oct. 1, 1986, and U.S. Pat. No. 4,471,477, issued Sep. 11, 1984, and No. 4,482,989, issued Nov. 13, 1984, all assigned to the present assignee and relating to apparatus for optical scanning of a record carrier. Such documents are incorporated herein by reference.

In said European Patent Specification a focus control system of the optical scanning apparatus constitutes a control loop as referred to herein. Said two U.S. Patents describe a control system which constitutes a control loop for controlling the position of the optical scanning apparatus relative to the record carrier as it is scanned.

For supplying calibration signals to such control loops the information signal produced by the optical scanning apparatus and/or one or more optically generated measurement signals may be used. The performance of the scanning apparatus and its associated control loops depends inter alia on optical, mechanical and electrical tolerances and other imperfections, which may give rise to instabilities or control errors. An asymmetrical intensity distribution in the scanning beam may give rise to an offset error, while for example the properties of the record carrier itself dictate the strength of the information signal and the measurement signals and so affect the overall gain and consequently the bandwidths of the control loops. If the bandwidth is too large this may lead to unstable control of the scanning apparatus. Therefore, it is paramount to provide control loops whose properties and performance are maintained as constant as possible. In the prior art scanning apparatus described above information is derived about deviations from the desired gain and offset error of the control loops. In operation, the focusing system and the positioning system are each continuously supplied with a sinusoidal signal, herein denoted as a calibration signal, of a selected frequency and magnitude. The magnitude is, for example, adapted to the dimensions of the recorded data areas on the record carrier to be scanned, while the frequency limits are dictated specifically by the (mechanical) drive means employed in the relevant scanning apparatus. The response to the applied sinusoidal calibration signal can be determined from the resulting control signals produced in the control loops, using detection techniques which are known in the art such as amplitude or phase detection.

The choice of the frequency of the calibration signal is dictated mainly by the requirement of minimal heat dissipation and hence minimal electric power consumption, which is of particular importance for compact portable scanning devices powered by batteries or accumulators. It has been found that in the case of a typical calibration signal having a frequency of the order of 200 Hz, about 80 % of the electric power consumed by, for example, the positioning system, is due to the calibration signal.

It is possible to demonstrate that the electric power of the calibration signal is directly proportional to the fourth power of its frequency. Therefore, a comparatively low frequency is to be preferred from the point of view of power consumption. However, it has also been found that in the case of, for example, portable scanning devices comprising a separate audio reproduction system, acoustic feedback occurs which is most pronounced in the range between 100 and 400 Hz. In particular, in situations with comparatively high sound levels, the control signals in the control loops may be disturbed by the sound to an undesirable extent regardless whether amplitude or phase detection is employed.

SUMMARY OF THE INVENTION

It is an object of the invention to improve the previously described method in such a manner that the required detection of the parameters of the control loop or loops can be achieved by employing a calibration signal of comparatively high frequency and without the electric power consumption being significantly higher than with a calibration signal of lower frequency. Obviously, it is desirable to minimize the electric power consumption.

In accordance with the present invention, this is achieved in that the control loop is only intermittently supplied with the calibration signal, for example using an on/off ratio as low as 0.05.

The invention is based on recognition of the fact that scanning of a record carrier is a process the parameters of which vary comparatively slowly, which in principal do not require continuous adjustment. A given adjustment of the gain and offset can therefore be continued even during intervals in which calibration of the control loop is interrupted.

By only intermittently or discontinuously performing calibration of the control loop, the overall power consumption and undesired heat dissipation can be reduced. Consequently, it is possible to employ a comparatively high frequency calibration signal above the frequency range in which spurious signals occur. In the case of the aforementioned portable optical scanning devices, it is possible, for example, to use a calibration signal frequency of the order of 500 Hz, which reduces the susceptibility of the control loop to acoustic feedback.

Another advantage of a comparatively high frequency calibration signal is that a more sensitive detection of the response thereto can be achieved by phase detection than in the case of amplitude detection. Phase detection can be realized simply by synchronous detection, which is known in the art, and which also is employed for detection of offset error. The calibration signal may be applied, for example, periodically.

In principle, the method in accordance with the invention can be applied to any adaptive digital control loop employing an external calibration signal for determination of the loop parameters.

A further advantage of the method in accordance with the invention resides in the fact that the calibration signal source and the associated loop response detection means may be common to a plurality of control loops for controlling various different parameters of the scanning apparatus. This means that for adjusting the parameters of a plurality of control loops only a minimal number of additional circuit components, and in the case of software-controlled components a minimum of additional software, is required.

The invention also relates to apparatus for optically scanning a record carrier, which advantageously utilizes the method in accordance with the invention. Such apparatus comprises a radiation source for producing a scanning beam, means for focusing the scanning beam on the record carrier, drive means for producing a relative movement between the record carrier and the scanning beam for the purpose of scanning the record carrier, read means for detecting the information in the beam obtained as a result of scanning of the record carrier, scanning error detection means for producing a signal representative of the devication between the instaneous location at which the scanning beam is incident on the record carrier and the desired scanning point thereon, and first and second control loops responsive to the scanning error signal to generate a first control signal for the focusing means and a second control signal for the drive means, respectively, in order to reduce said scanning deviation. The scanning error detection means, first control means and focusing means constitute a first control loop for focus control. The scanning error detection means, second control means and drive means constitute a second control loop for scanning position control. The scanning apparatus in addition comprises loop parameter stabilizing means comprising means for supplying a calibration signal to at least one of the control loops, means for detecting the signal produced by the relevant control loop in response to the supplied calibration signal, and means for deriving from the response signal a loop adjustment signal for adjusting a paramenter of such control loop which determines the loop response to the calibration signal, so as to maintain such parameter substantially constant. The scanning apparatus is also provided with first switching means coupled to the calibration signal source for intermittently interrupting the calibration signal. The adjustment signal is stored in digital form, so that it is maintained without drift during off intervals of the calibration signal and continues to stabilize the loop parameter during such intervals.

A further illustrative embodiment of the scanning apparatus in accordance with the invention, which is advantageous for reasons of circuit engineering, is characterized in that there are provided second switching means for coupling the loop parameter stabilizing means to either of the two control loops.

As described hereinbefore, the performance of the optical scanning apparatus and associated control loops depends on tolerances and other imperfections, inter alia the properties of the record carrier itself, which necessitates adaptive control of the parameters of the control loops such as the gain and offset thereof.

In general, the record carrier properties, for example its reflectivity in the area to be scanned, will be constant. Therefore, a one-time adjustment of the focus control loop is usually adequate. The preferred embodiment of apparatus in accordance with the invention is therefore characterized in that the switching means are adapted to couple the loop parameter stabilizing means to the focus control loop only during start-up of the apparatus.

In another illustrative embodiment of scanning apparatus in accordance with the invention an optimum correction of scanning error is achieved in that the switching means are adapted to couple the loop parameter stabilizing means alternately to the first and second control loops. This embodiment effectively reduces the influence of local disturbances in, for example, the reflectivity of the record carrier as a result of stains or scratches thereon and the like.

When one or both control loops are supplied intermittently with a calibration signal of high frequency, of the order of twice that employed in the prior art apparatus wherein such control loops were excited continuously, the electric power consumption can be greatly reduced by setting the ratio between the on-interval and the off-interval of the first switching means to a value so low as 0.05. A smaller ratio than 0.05 will not reliably stabilize against variation of loop gain and offset.

BRIEF DESCRIPTION OF THE DRAWINGS

The invention will be described with reference to the accompanying drawings, wherein.

DESCRIPTION OF THE PREFERRED EMBODIMENTS

On optical disc-shaped record carriers the information to be scanned is arranged in tracks in accordance with a spiral or concentric pattern. The properties of the disc are such that an incident scanning beam is reflected therefrom. The information to be detected is represented by the presence or absence of a series of pits in each of the tracks to be scanned.

In general, the scanning beam is generated by a radiation source such as a solid state laser or a helium-neon laser. The light beam produced by the radiation source is processed to form a scanning beam of the desired cross-section via adjustable focussing means comprising one or more lenses. For scanning of the tracks, the scanning apparatus is movable in a radial direction relative to the disc surface by actuating and positioning means.

The beam reflected from the record carrier contains information indicating the presence or absence of pits in the scanned track, which information can be processed by a radiation detector and signal processing circuit in accordance with the prior art.

In practice the record carriers have a spiral information track having a width of approximately 0.6 $\mu$m and a track pitch of 1.6 μm. The average depth of the pits is approximately 0.12 μm. For scanning such an information structure, the scanning beam should accurately follow the information track and be accurately kept in focus. For the purpose of controlling the beam focusing and positioning, a scanning error measurement signal is derived which is representative of the deviation between the instantaneous location at which the scanning beam is incident on the record carrier and the desired scanning point. In accordance with the prior art, such an error signal may be produced by two further detectors arranged in the same plane as the read detector for detecting the information in the reflected scanning beam. As is known from the prior art, signals for controlling the beam position and beam focus can be derived from the scanning error signal produced by such two further detectors.

As already stated above, the focus control loop and position control loop are subject to optical, mechanical and electrical tolerances, and their operation further depends on the properties of the record carrier itself, such as the reflectivity, the depth of the pits and the like. As a result of deviations in these parameters, the gain of the control loops, and hence the bandwidth thereof will vary. This is comprehensively described and illustrated in the aforementioned European and two U.S. patents. Bandwidth variations may give rise to instabilities in the control of the optical scanning apparatus. In particular, deviations in the properties of the record carrier require adaptive control of the bandwidth of the control circuits.

Figure 1:
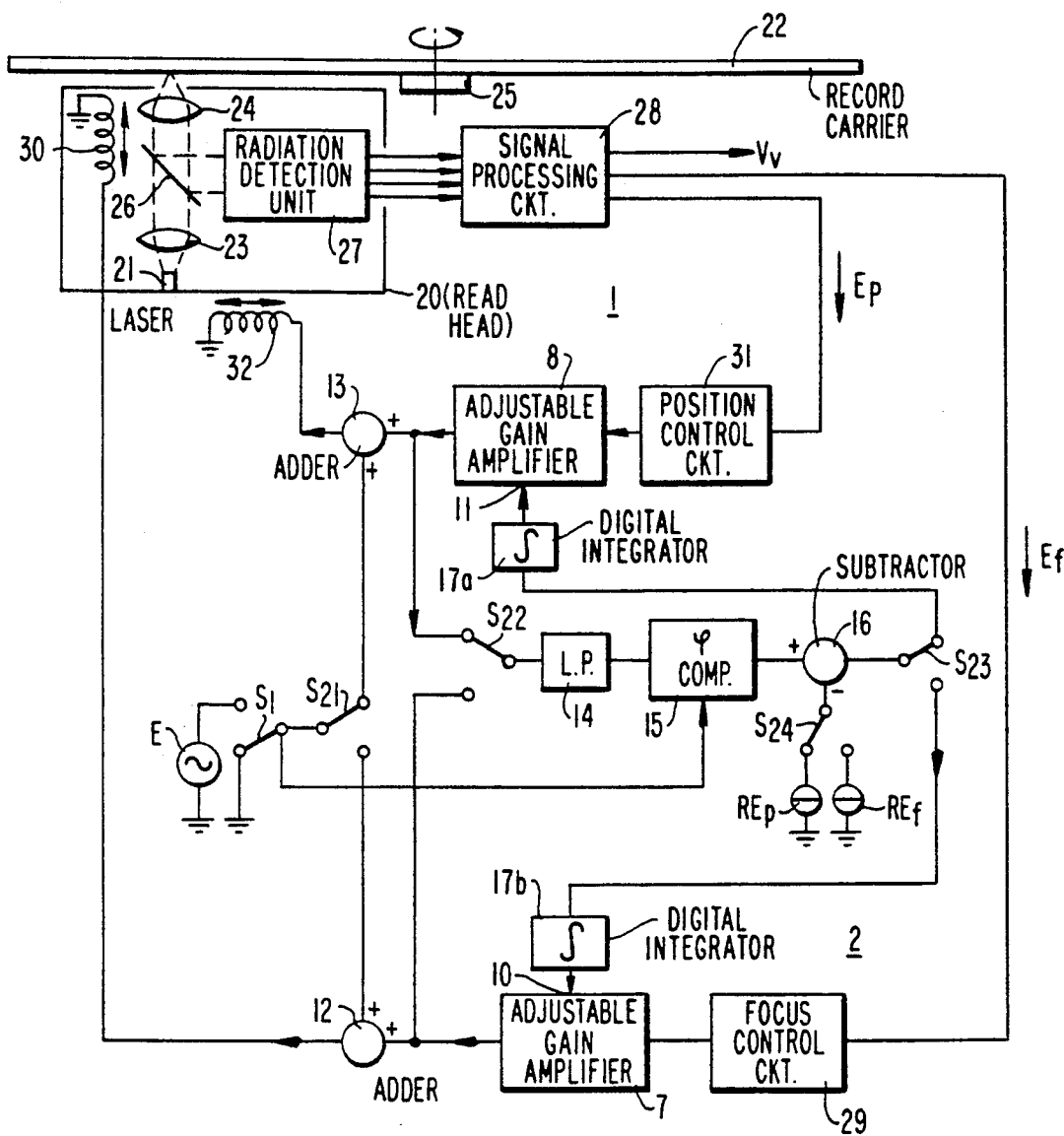
FIG. 1 shows an embodiment of record carrier scanning apparatus according to the invention.

The scanning apparatus is FIG. 1 adaptively stabilizes the gain and the offset error of each of two control loops. The stabilizing means includes means for supplying a calibration signal and means for deriving a measure of the relevant parameters of either control loop from the detected response of such loop to the calibration signal, so as to enable adjustment of those parameters when necessary.

In FIG. 1 a conventional optical read head 20 includes a radiation source, for example a semiconductor laser 21. The laser 21 generates a radiation beam which is directed to the record carrier 22 via an optical system of a usual type. The optical system comprises an objective lens 23 and a focussing lens 24 for focusing the radiation beam on a track in a recording layer of the record carrier 22, so as to produce a small scanning spot thereon. In order to produce scanning of the tracks on the record carrier it is rotated by means of a motor 25. The radiation beam reflected from the record carrier is modulated in accordance with the information recorded thereon. This modulated radiation beam is guided by a beam separator 26 to a radiation detection unit 27 of conventional type which supplies a number of radiation detection signals to a processing circuit 28 which derives therefrom a read signal $V_r$ representing the information read from the record carrier, a position error signal $E_p$ representing the transverse deviation between the center of the scanning spot and the center of a scanned, and a focus error signal $E_f$ representing track being the vertical deviation between the position of the focal point of the beam and the recording layer of the record carrier. In the position control loop 1 the position error signal $E_p$ is supplied to a position control circuit 31 which derives therefrom a drive signal for a radial position actuator 32 for moving the scanning spot in a radial direction such that the center thereof is substantially maintained on the centerline of the track being scanned. Such drive signal is supplied to actuator 32 via an amplifier 8 having an adjustable gain factor, and an adder 13 which is further described below. In the focus control loop 2 the focus error signal $E_f$ is supplied to a focus control circuit 29 which derives therefrom a drive signal for a focus actuator 30 for moving the focal point of the scanning beam with respect to the recording layer so that the focal point is substantially maintained on such layer. This drive signal is supplied to actuator 30 via an amplifier 7 having an adjustable gain factor, and an adder 12 as described below.

Figure 2:
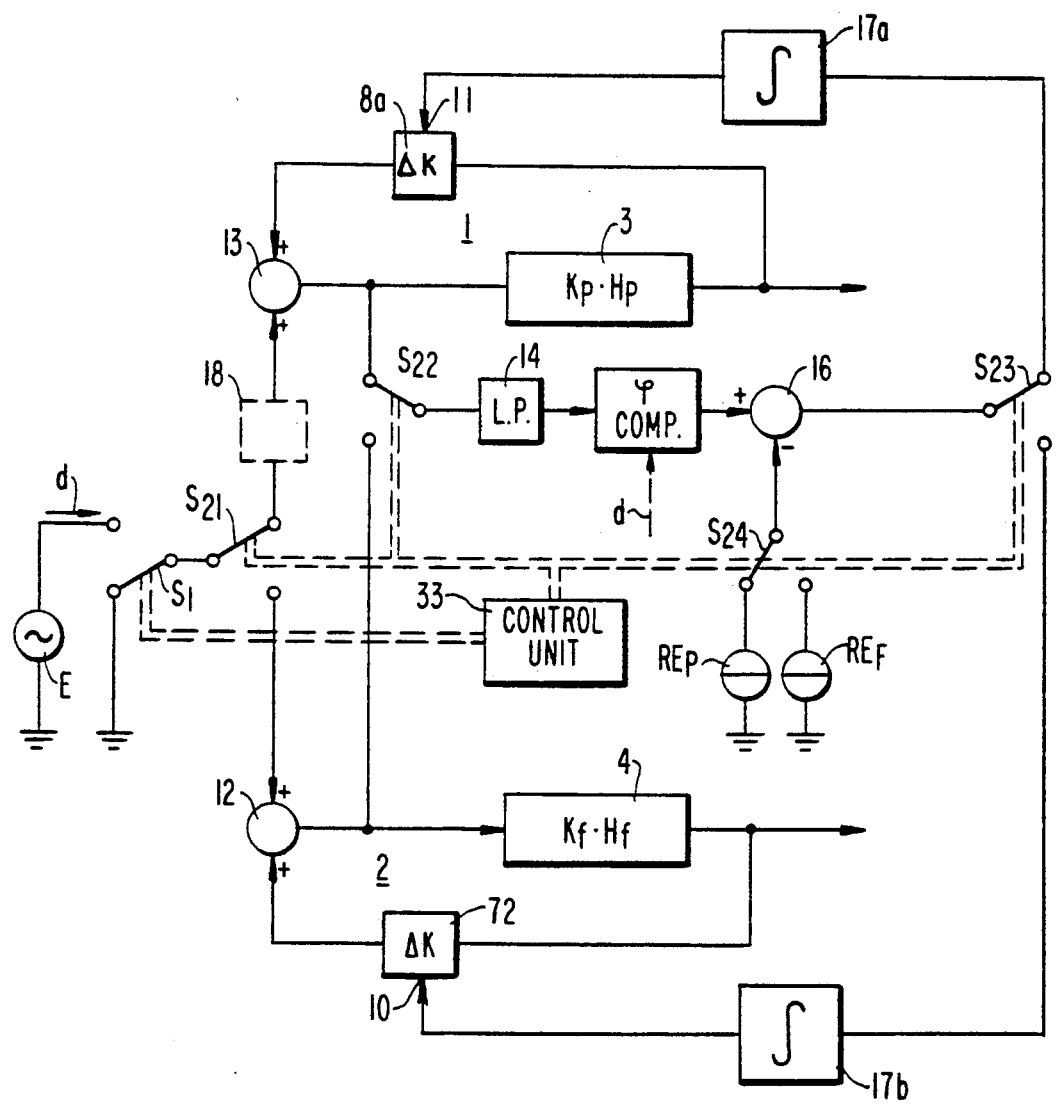
FIG. 2 is a block diagram of the same apparatus as in FIG. 1 further including a programmable control unit for controlling the various switching function. Various elements of FIG. 1 are represented in FIG. 2 by their signal transfer functions, corresponding elements in both FIGURES having the same reference numerals.

The overall gain, and consequently the bandwidth, of each control loop can be stabilized at a selected value by controlling the gain of the relevant adjustable gain amplifier 7 or 8. For that purpose, the circuit includes a calibration signal source E which supplies, for example, a sinusoidal calibration signal "d" of known properties e.g. its amplitude and frequency. The calibration signal d can be injected into the circuit by closing the switch $S_1$, which is shown in the open position in FIG. 1. From switch S1 the calibration signal can selectively be supplied to either adder 12 or adder 13, depending on the position of a switch $S_{21}$. In FIG. 2 the switch $S_{21}$ is shown as connected to adder 13 in the position control loop 1, and consequently the calibration signal δ will be supplied together with the drive signal to radial position actuator 32. The calibration signal will therefore result in a position control signal at the output of amplifier 8 which includes as a component thereof a loop response signal corresponding to the calibration signal as modified by the transfer characteristic of the entire position control loop 1.

By means of a switch $S_{22}$, which is shown in FIG. 1 as thrown so as to be connected to the output of amplifier 8, such position control signal is supplied to a low-pass filter 14 which separates out the loop response signal and supplies it to a detector 15 which can be an amplitude comparator or preferably a phase comparator. It is shown in FIG. 1 as a phase comparator which compares the phase of the loop response signal with that of the original calibration signal so as to derive a signal indicative of the phase shift of control loop 1. Such signal is supplied to a subtractor 16, wherein it is referenced to an optimum level $RE_p$ set by a DC reference voltage of that value supplied to the subtractive input of subtractor 16 via a switch $S_{24}$. The operation of phase comparator 15, subtracter 16, and selection of an appropriate reference voltage level, are all as described in the above referenced U.S. Pat. No. 4,471,477. The signal at the output of subtracter 16 will be an oscillatory signal of an amplitude relative to the reference level $RE_p$ which corresponds to variation of the overall gain and frequency transfer characteristic of the position control loop 1 from the optimum values thereof. Such signal is integrated by a digital integrator 17a so as to derive an adjusting signal for controlling the gain of amplifier 8 in accordance therewith. The integrator 17a can be a conventional analog integrator circuit coupled to an A/D converter the output of which is stored in a digital store such as a shift register or other form of digital memory. In this way the value of the gain adjusting signal is maintained without drift during the intervals in which the calibration signal is interrupted. The gain of amplifier 8 is thereby adjusted so as to maintain the overall gain and consequently the bandwidth of position control loop 1 substantially constant.

For calibration of the focus control loop 2, which comprises focus control circuit 29, adjustable gain amplifier 7 and adder 12, that is achieved by resetting switches $S_{21}$, $S_{22}$, $S_{23}$ and $S_{24}$ opposite to the setting thereof shown in FIG. 1. Switch $S_{24}$ then supplies a DC reference voltage $RE_f$ to the subtractive terminal of subtractor 16, the value of which corresponds to an optimum value of the overall gain of focus control loop 2. The operation of control loop 2 in response to the focus error signal $E_f$ is essentially the same as described above for the operation of control loop 1 in response to the position error signal $E_p$, corresponding elements of both control loops being identified with the same reference numerals. In control loop 2 the oscillatory signal produced by subtractor 16 is supplied to the digital integrator 17b, corresponding to integrator 17a in control loop 1, the output of which is an adjusting signal which adjusts the gain of amplifier 7 so as to maintain the overall gain of focus control loop 2 substantially constant.

Referring now to FIG. 2, this shows in block form the same apparatus as in FIG. 1 except that various elements in FIG. 1 are represented by their signal transfer functions. Corresponding elements in both FIGURES have the same reference numerals. The block 3 of control loop 1 in FIG. 2 represents the overall gain $K_p$ and overall frequency transfer characteristic $H_p$ of such loop. It therefore represents the elements which in FIG. 1 include read head 20, signal processing circuit 28, position control circuit 31, amplifier 8 and position actuator 32. The adder 13 does not affect the gain or frequency transfer characteristic. The block 8a in FIG. 2 represents the gain variation $\Delta K$ of amplifier 8 in FIG. 1. Similarly, the focus control loop 2 in FIG. 2 includes a block 4 which represents the overall gain $K_f$ and overall therefore represents the elements which in FIG. 1 include read head 20, signal processing circuit 28, focus control circuit 29, amplifier 7 and focus actuator 30. The adder 12 does not affect the gain or frequency transfer characteristic. The block 7a in FIG. 2 represents the gain variation $\Delta K$ of amplifier 7 in FIG. 1. The gain variation represented by block 8a is determined by the loop adjustment signal supplied to the control input 11 thereof. Similarly, the gain variation represented by block 7a is determined by the loop signal supplied to the control input 10 thereof. It is to be understood that in each case such gain variation means the variation of the overall gain of the relevant control loop rather than only of the adjustable gain of the amplifier which is controlled to produce such gain variation. In order to adapt the amplitude of the calibration signal d to the individual control loops, an attenuator as represented by the block 18 shown in broken lines may be included in the path from switch $S_{21}$ the input of adder 13 in control loop 1.

As shown in FIG. 2, the apparatus also includes a control unit 33 for actuating all of the switches $S_1$, $S_{21}$, $S_{22}$, $S_{23}$, and $S_{24}$. Such control unit may be a processor loaded with a suitable control program so as to cause the switches to be set to positions which selectively and intermittently excite the position control loop 1 and focus control loop 2 with the calibration signal d in order to adjust the loop gain factor by the amount $\Delta K$ necessary to stabilize the overall loop gain against variation. The dotted lines connecting control unit 33 to each of the switches signifies that such switches are actually comprised therein or electrically coupled thereto.

Figure 3:
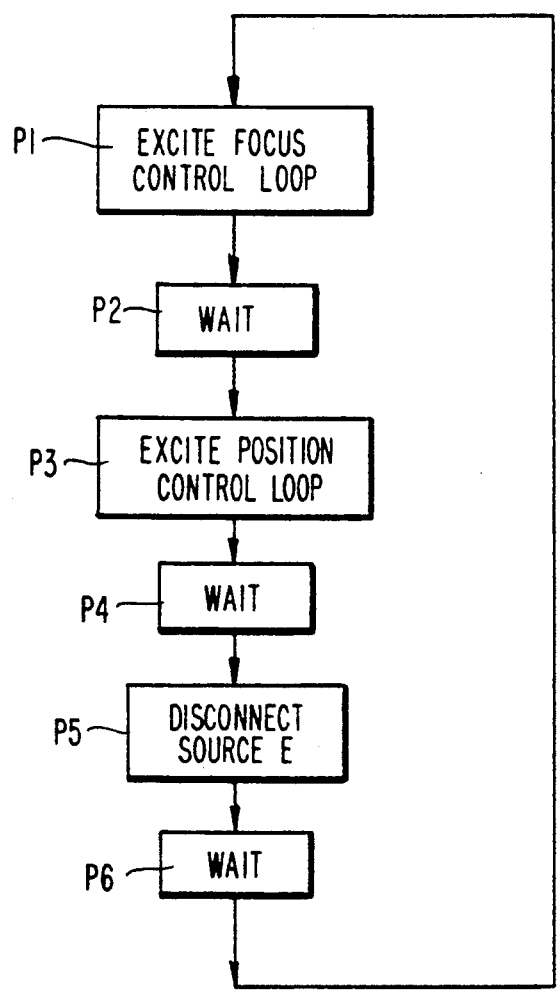
FIG. 3 is a flow diagram of a program for the control unit shown in FIG. 2.

FIG. 3 is a flow diagram of a suitable program for control unit 33. In step P1 the switch $S_1$ is connected to the signal source E and switch $S_{21}$ is connected to supply calibration signal d to adder 13 so as to excite position control loop 1. In addition, switch $S_{22}$ is connected to the output of adder 13, switch $S_{24}$ is connected to reference source $RE_p$ and switch $S_{23}$ is connected to integrator $17_a$. With the switches in these positions, the response of the position control loop 1 to the calibration signal d is detected by the detection circuit 15. Subtractor 16 compares this response with the reference signal $RE_p$, representing the response value for which the gain of the position control loop is optimum. The output of subtractor 16 is supplied to integrator 17a, resulting in a change of the loop adjustment signal supplied thereby to the control terminal 11 of variable gain element 8a. Consequently, the gain of the position control loop is controlled to a value at which the detected response at the output of subtractor 15 corresponds to the optimum value of such response as represented by the reference signal $RE_p$ Such adjustment of the gain of control loop 1 takes a very short time interval, e.g. a few seconds of the playing time of the record carrier 20. Step P2 is a waiting interval during which the program pauses long enough to complete adjusting the gain of the position control loop 1.

The wait step P2 is followed by a step P3 in which switches S21, S22, S23, and S24 are switched to their alternative positions, so as to perform an adjustment of the gain of the focus control loop 2 in a similar matter as the adjustment of the gain of the position control loop 1.

Step P5 is a wait interval long enough to complete adjustment of the gain of focus control loop 2, and during such step the switch $S_1$ is disconnected from the source E. The succeeding step P6 is a relatively long wait interval, set in accordance with the time during which it has been ascertained that there will be relatively little variation in the gain of either the position control 1 loop or focus control loop 2. In the case of optical record carriers the focus control loop parameters change very slowly, so that it generally suffices to adjust the gain of the focus control loop only once. However, it is preferable to periodically repeat adjustment of the position control loop every few minutes.

It will be appreciated that stabilization of the control loops as described provides an adaptive optimum setting of the focusing and beam positioning of the scanning apparatus with a minimum number of separate expensive components. Intermittent switching of the calibration signal produced by source E enables a calibration signal of relatively high frequency to be employed, without increasing or even with a reduction of power consumption as compared with prior art optical scanning apparatus.

The invention is particularly suitable for battery-energized devices, for example a portable CD player, because in such devices the power consumption must be kept as low as possible to achieve reasonably long battery life.

What is claimed is:

1. A method of detecting and stabilizing a control parameter of a control loop which is included in record carrier scanning apparatus for controlling a scanning parameter of such apparatus; said method comprising the steps of:

supplying a calibration signal to said control loop which is intermittently interrupted, and which during each on-interval thereof is transmitted through the control loop and modified by said control parameter thereof to result in a signal representing the loop response to said calibration signal;

detecting the loop response signal and comparing it with the calibration signal so as to derive a control signal corresponding to variation of said control parameter from a reference value thereof; and deriving from said control signal an adjustment signal for adjusting said control parameter so as to maintain it substantially at said reference value thereof even during off-intervals of said calibration signal;

whereby said control parameter is stabilized against spurious variations.

2. A method as claimed in claim 1, wherein the intermittent interruptions of said calibration signal are periodic.

3. A method as claimed in claim 1, wherein said scanning apparatus includes a plurality of control loops for controlling respective scanning parameters of said apparatus, each such control loop controlling the relevant scanning parameter by variation of a control parameter of such control loop; said method further comprising selectively supplying said intermittently integrated calibration signal to each of said control loops so as to derive respective adjustment signals for adjusting the control parameters of the respective control loops to selected optimum values of such parameters; whereby the control parameters of each control loop is stabilized against spurious variations.

4. Apparatus for scanning recording tracks of an optical record carrier, said apparatus comprising:

a radiation source for producing a scanning beam;

means for focussing the scanning beam to a focal point on the record carrier;

drive means for producing relative movement between the record carrier and the scanning beam so as to cause the beam to scan the recording tracks;

read means for producing detection signals corresponding to radiation produced from the record carrier tracks during scanning thereof;

circuit means responsive to the detection signals to derive at least one error signal corresponding to the deviation between the focal point of the scanning beam and a correct scanning position thereof; and a control loop responsive to said one error signal to control said drive means to minimize such signal, such control loop having a control parameter which is variable to adjust the loop response to said one error signal;

characterized in that said apparatus further comprises:

calibration signal generating means for selectively supplying an intermittently interrupted calibration signal to said control loop which is transmitted through such loop and modified by the control parameter thereof so as to result in a signal representing the loop response to the calibration signal;

means for detecting said loop response signal and comparing it with the calibration signal so as to derive a control signal corresponding to variation of said control parameter of the control loop from a selected reference value thereof; and integrating means for deriving from said control signal an adjustment signal for adjusting said control parameter of the control loop so as to maintain it substantially at said reference value thereof even during the interrupted intervals of the calibration signal;

whereby said control parameter of said control loop is stabilized against spurious variations.

5. Scanning apparatus as claimed in claim 4, further comprising switching means for producing said intermittent interruption of the calibration signal.

6. Apparatus for scanning recording tracks of an optical record carrier, said apparatus comprising:

a radiation source for producing a scanning beam;

means for focussing the scanning beam to a focal point on the record carrier;

drive means for producing relative movement between the record carrier and the scanning beam so as to cause the beam to scan the recording tracks;

read means for producing detection signals corresponding to radiation produced from the record carrier tracks during scanning thereof;

circuit means responsive to the detection signals to derive a position error signal and a focus error signal, the position error signal corresponding to the deviation between the focal point of the scanning beam and the center of a track being scanned, the focus error signal corresponding to the deviation between the focal point of the scanning beam and a correct focal distance from said track; and a position control loop and a focus control loop, the position control loop being responsive to the position error signal to control said drive means to minimize the position error signal and the focus control loop being responsive to the focus error signal to control said focussing means to minimize the focus error signal; each of said control loops having a control parameter which is variable to adjust the response of the control loop to the relevant error signal;

characterized in that said apparatus further comprises:

calibration signal generating means for selectively supplying an intermittently interrupted calibration signal to each of said control loops, and which during each on interval thereof is transmitted through the then selected control loop and modified by the control parameter thereof to result in a signal representing the response of the selected loop to the calibration signal;

means for detecting said loop response signal of the selected control loop and comparing it with the calibration signal so as to derive a control signal corresponding to variation of the control parameter of such control loop from a integrating means for deriving from said control signal an adjustment signal for adjusting the control parameter of the selected control loop so as to maintain it substantially at said reference value thereof even during intervals in which supply of the calibration signal to such control loop is interrupted;

whereby the central parameter of each central loop is stabilized against spurious variations.

7. Scanning apparatus as claimed in claim 6, further comprising: first switching means for producing said intermittent interruption of the calibration signal, and second switching means for selectively coupling said first switching means and said detection means to either of said control loops.

8. Scanning apparatus as claimed in claim 7, wherein the first and second switching means are both comprised in a programmable digital logic circuit.

9. Scanning apparatus as claimed in claim 4, wherein said control parameter of said control loop is the gain factor thereof, and the adjustment signal supplied to said control loop adjusts the gain factor thereof so as to stabilize it against spurious variations.

10. Scanning apparatus as claimed in claim 7, wherein said second switching means is adapted to couple said first switching means and said detection means to said focus control loop upon start-up of said apparatus, so as to initially stabilize the gain factor of the focus control loop substantially at the selected reference value thereof.

11. Apparatus as claimed in claim 4, wherein said switching means is adapted to intermittently interrupt said calibration signal so that the ratio of the on-interval to the off-interval thereof is at least 0.05.

12. Apparatus as claimed in claim 5, wherein said first switching means is adapted to intermittently interrupt said calibration signal so that the ratio of the on-interval to the off-interval thereof is at least 0.05.

* * * * *